United States Patent
Vachon

(10) Patent No.: US 7,201,135 B2
(45) Date of Patent: Apr. 10, 2007

(54) INTERNAL COMBUSTION ENGINE

(75) Inventor: John T. Vachon, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 11/076,339

(22) Filed: Mar. 9, 2005

(65) Prior Publication Data

US 2006/0201478 A1    Sep. 14, 2006

(51) Int. Cl.
*F02B 17/00* (2006.01)
*B05B 1/00* (2006.01)

(52) U.S. Cl. .................... 123/294; 123/305; 239/596; 239/601

(58) Field of Classification Search ........ 123/294–305; 239/533.12, 601, 602, 596, 597
See application file for complete search history.

(56) References Cited

U.S. PATENT DOCUMENTS

| | | | | |
|---|---|---|---|---|
| 4,857,696 A | * | 8/1989 | Taeusch et al. | 219/121.7 |
| 5,037,031 A | * | 8/1991 | Campbell et al. | 239/533.3 |
| 5,042,721 A | * | 8/1991 | Muntean et al. | 239/533.3 |
| 5,237,148 A | * | 8/1993 | Aoki et al. | 219/121.7 |
| 5,392,745 A | * | 2/1995 | Beck | 123/295 |
| 6,070,813 A | * | 6/2000 | Durheim | 239/533.2 |
| 6,325,040 B1 | * | 12/2001 | Tanaka | 123/294 |
| 2003/0042326 A1 | * | 3/2003 | Jameson et al. | 239/102.2 |

OTHER PUBLICATIONS

Dr. Schrick Company; Diesel Engine For Unmanned Aircract, FOCUS; publication prior to Jan. 1, 2005, p. 30; Remscheid, Germany.

* cited by examiner

*Primary Examiner*—John T. Kwon
(74) *Attorney, Agent, or Firm*—Liell & McNeil

(57) ABSTRACT

The present disclosure provides an internal combustion engine having an engine housing with at least one cylinder that has diameter less than about 3 inches. A fuel injector is provided and disposed at least partially within the at least one cylinder, and includes a plurality of outlet orifices having a diameter between about 50 microns and about 110 microns. The disclosure further provides a method of operating an internal combustion engine. The method includes the steps of rotating an engine crank shaft of the engine at a speed greater than about 5000 revolutions per minute, injecting a quantity of fuel into each of the cylinders, and burning at least every fourth piston stroke a sufficient quantity of the injected fuel to yield a brake mean effective pressure of at least about 200 lbs. per square inch.

19 Claims, 3 Drawing Sheets

INTERNAL COMBUSTION ENGINE

TECHNICAL FIELD

The present disclosure relates generally to internal combustion engines, and relates more particularly to small bore direct injection internal combustion engines that utilize fuel injectors with tiny outlet orifices.

BACKGROUND

Internal combustion engines have long been used as power sources in a broad range of applications. Internal combustion engines may range in size from relatively small, hand held power tools to very large diesel engines used in marine vessels and electrical power stations. In general terms, larger engines are more powerful, whereas smaller engines are less powerful. Engine power can be calculated with the following equation, where "BMEP" is brake mean effective pressure, the average cylinder pressure during the power stroke of a conventional four-stroke piston engine:

Power=(BMEP)×(Engine Displacement)×(RPM)× (1/792,000).

(English Units)

While larger engines may be more powerful, their power-to-weight or size ratio or "power-density" will be typically less than in smaller engines. Power varies with the square of a given scale factor whereas weight and volume vary with the cube of the scale factor. Scaling engine size up by a factor of two, for example, by doubling the cylinder bore size and doubling the piston stroke of a typical engine will, with everything else being equal, increase power about four times. The size and weight, however, will increase by about eight times. The "power density" may thus decrease by one half. The same principles are generally applicable when attempting to scale down an engine. Where bore size of a typical engine is decreased by a factor of two, engine power will decrease by a factor of four, but size and weight of the engine will decrease by a factor of eight. Thus, while smaller engines will have comparatively less available power output, their theoretical power density will in many cases be greater than similar larger engines.

Another related factor bearing on power density is the stroke distance of pistons in a particular engine. In many engines, there is a trade-off between stroke distance and RPM. Relatively longer stroke engines tend to have more torque and lower RPM, whereas relatively shorter stroke engines tend to have lower torque and greater RPM. Even where a short stroke engine and a long stroke engine have the same horsepower, the shorter stroke engine may have a greater power density since it may be a shorter, smaller engine.

For many applications, smaller, more power dense engines may be desirable. In many aircraft, for example, it is desirable to employ relatively small, lightweight, power dense engines with a relatively large number of cylinders rather than large engines having relatively fewer cylinders. However, attempts to scale down many internal combustion engines below certain limits have met with little success, particularly with regard to direct injection compression ignition engines. Many smaller, theoretically more power dense engines may be incapable of fully burning sufficient fuel per each power stroke in their comparatively small cylinders to meet higher power demands.

For example, if a conventional engine is running at a lower temperature and boost, where relatively small fuel quantities are injected for each cycle, and more power is demanded of the engine, an inability to burn the higher demanded fuel quantities may limit the engine's power output. As more fuel is injected over longer injection times, the liquid fuel spray can contact the piston surfaces and any other combustion chamber surfaces, known in the art as "wall wetting," before it has a chance to adequately mix with the cylinder's fresh charge of air. This problem is particularly acute in smaller bore engines. Wall wetting can thus limit small bore engines to lower power and worse emissions than what intuitively could be their inherent capabilities, as wall wetting tends to cause poor combustion and high hydrocarbon and particulate emissions.

At relatively higher temperatures and in-cylinder pressures, wall wetting is less of a problem. Inadequate mixing of the fuel and air, however, can cause excessive smoke before combustion, limiting the engine's power long before its theoretical power limit is reached. One reason for these limitations is that at higher RPMs, there is only a relatively small amount of time within which to inject and ignite fuel in each cylinder.

As a result of the above limitations, two very general classes of small diesel engines have arisen, those that operate at relatively higher BMEP and lower RPM, and those that operate at relatively lower BMEP and higher RPM. However, neither type of engine is typically capable of providing an attractive power density commensurate with their size and weight. One example of a small bore diesel engine is the TKDI 600, designed by the Dr. Schrick company of Remscheid, Germany. The TKDI 600 claims a 34 KW output at 6000 RPM, or about 46 hp. The bore size of the TKDI 600 may be about 76 mm or about 3 inches, and the piston stroke may be about 66 mm or 2.6 inches. Although the TKDI 600 is claimed to have certain applications, such as in a small unmanned aircraft, the available BMEP is relatively low, about 169 PSI and the engine is therefore somewhat limited in its total available power output and hence, power density.

The present disclosure is directed to one or more of the problems or shortcomings set forth above.

SUMMARY OF THE DISCLOSURE

In one aspect, the present disclosure provides an internal combustion engine. The internal combustion engine includes, an engine housing having at least one cylinder, the cylinder having a diameter that is less than about 3 inches. The engine further includes a fuel injector disposed at least partially within the at least one cylinder. The fuel injector includes a plurality of outlet orifices having a diameter between about 0.05 millimeters and about 0.11 millimeters.

In another aspect, the present disclosure provides a method of operating an internal combustion engine. The method includes the step of, rotating an engine crank shaft at a speed greater than about 5000 revolutions per minute, wherein the crank shaft is coupled with a plurality of pistons each reciprocable at least partially within an engine cylinder having a diameter less than about 3 inches. The method further includes the step of injecting a quantity of liquid fuel into each of the cylinders at least once for every 4 strokes of the piston associated therewith. Further still, the method includes the step of igniting a sufficient quantity of liquid fuel in each cylinder to yield a brake mean effective pressure of at least about 200 lbs. per square inch.

In still another aspect, the present disclosure provides an internal combustion engine that includes an engine housing having at least one cylinder disposed therein. The engine further includes at least one piston disposed at least partially within the at least one cylinder, and defines a displacement less than about 25 cubic inches. The engine further includes at least one fuel injector operable to inject a fuel into the at least one cylinder, and having a plurality of outlet orifices with a diameter between about 0.05 millimeters and 0.11 millimeters.

DETAILED DESCRIPTION

Figure 1:
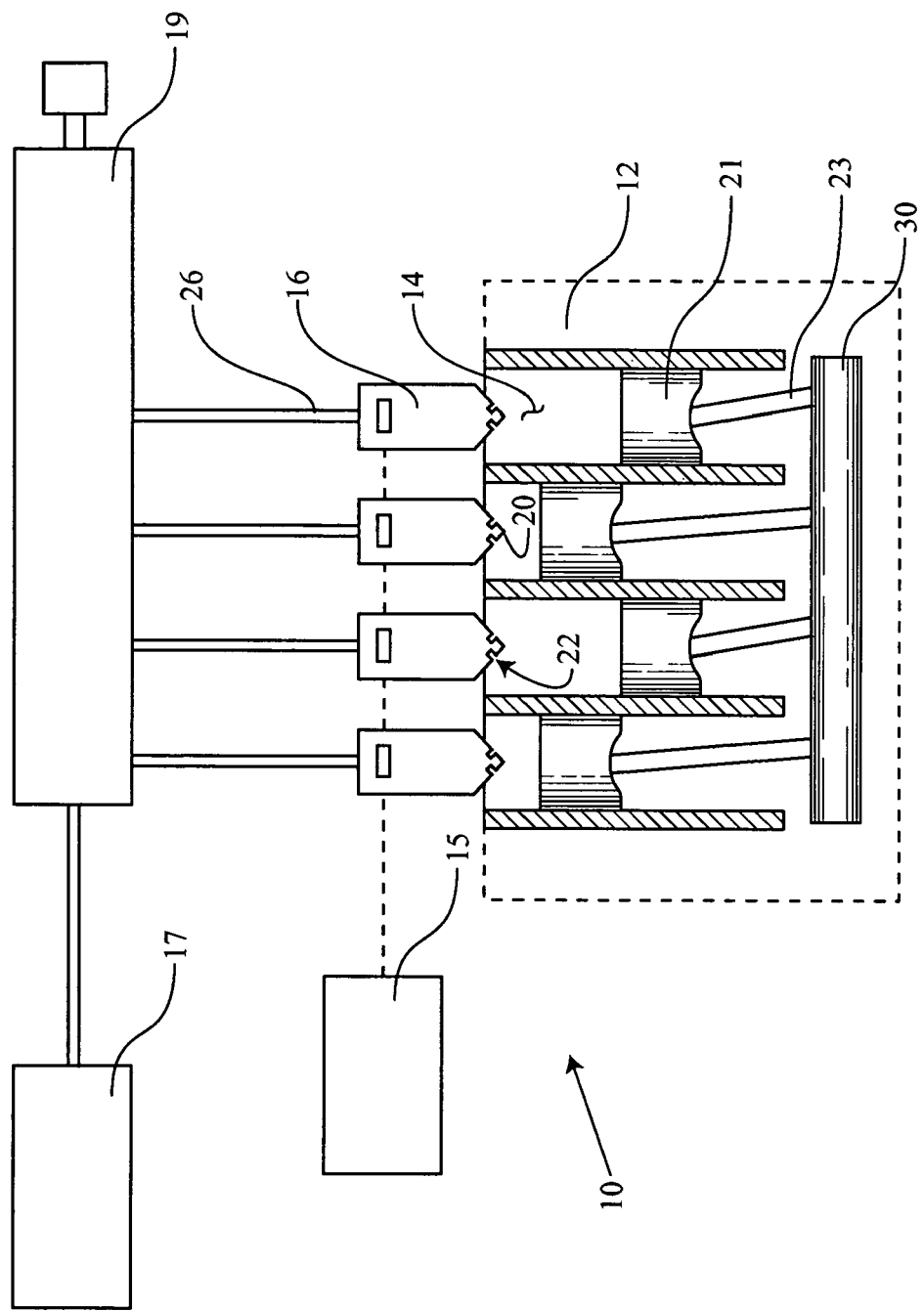
FIG. 1 is a schematic illustration of an engine according to the present disclosure.

Referring to FIG. 1, there is shown a schematic illustration of an engine 10 according to one embodiment of the present disclosure. Engine 10 includes an engine housing 12 having a plurality of cylinders 14 therein. A fuel injector 16 is disposed at least partially within each of cylinders 14 and operable to direct inject a liquid fuel therein. Each of fuel injectors 16 may include a fuel injector tip 20 extending into the associated cylinder, and each tip 20 has a plurality of outlet orifices 22. Engine 10 further includes a plurality of pistons 21, each disposed at least partially within one of cylinders 14 and movable therein, and each piston is coupled with a crankshaft 30 via a piston rod 23. Engine 10 may further include a pressurized fuel source 17, which may include a high pressure pump or cam-actuated fuel pressurizer, for example. Pressurized fuel source 17 may be fluidly connected with each of fuel injectors 16 via a high pressure feed line or common rail 19 and a plurality of supply passages 26. It is contemplated that source 17 will pressurize fuel to at least about 150 MPa, although the present disclosure is not thereby limited. Relatively higher pressures have in some instances been shown to facilitate atomization of injected fuel, however, the actual pressure may be selected based upon various desired operating characteristics of the particular engine, and feasibility. It is contemplated that engine 10 may be either a compression ignition engine, for example a diesel engine, or a spark ignited engine using, for instance, gasoline.

Figure 2:
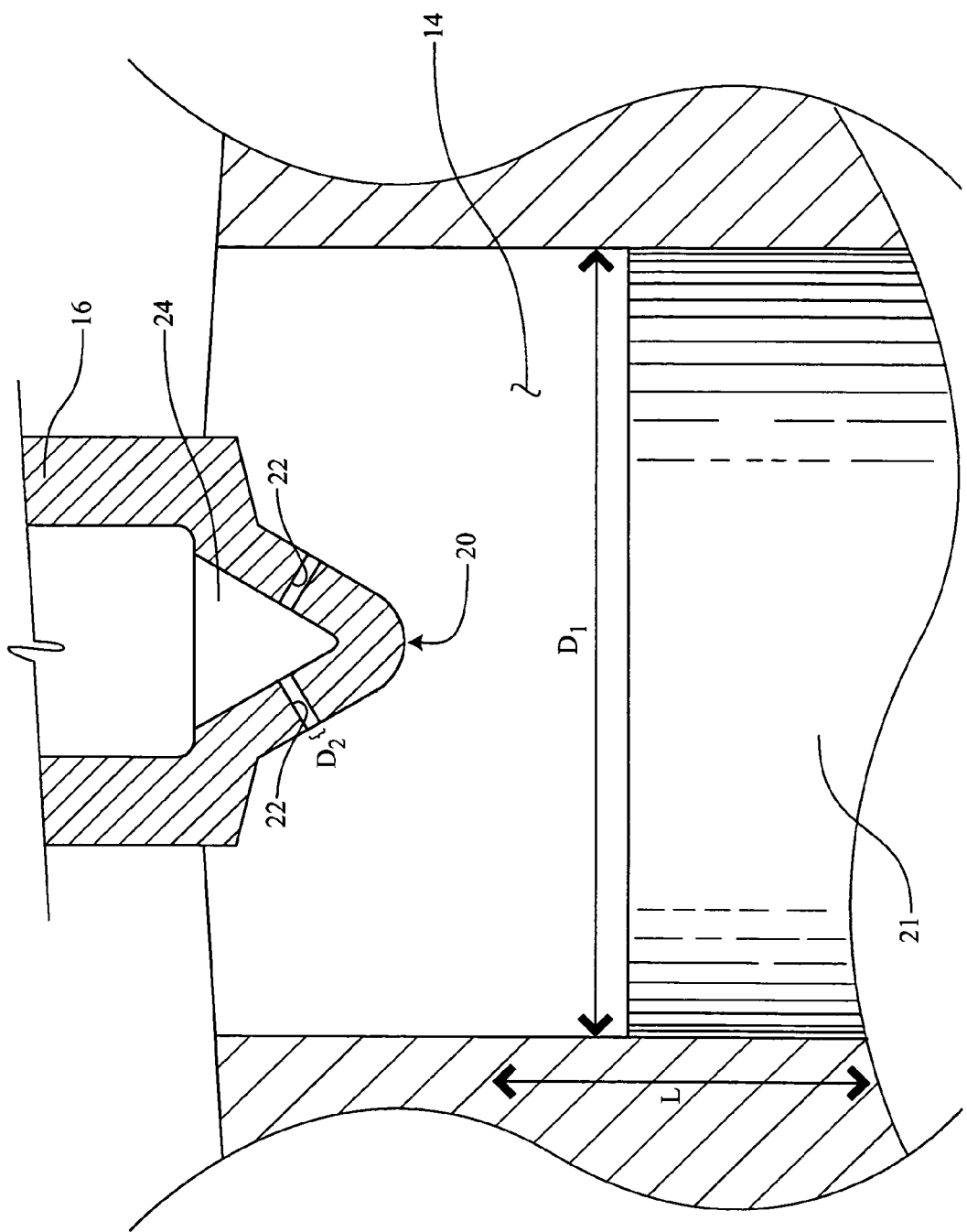
FIG. 2 is an enlarged sectioned side diagrammatic view of a portion of an engine cylinder that includes a fuel injector, according to the present disclosure.

Referring also to FIG. 2, there is shown a close-up view of a portion of engine 10 of FIG. 1, including a cylinder 14 with a piston 21 movably positioned therein. Each cylinder 14 of engine 10 will have a diameter $D_1$, that is less than about 3 inches, and may be between about 2 inches and about 3 inches. About 3 means between 2.5 and 3.5. About 2.5 means between 2.45 and 2.55. These examples will allow one to determine precisely what is meant by the phrase about X, in the context of the present disclosure. In certain embodiments, $D_1$ will be between about 2.5 and about 2.8 inches, and may also be about 2.7 inches in one practical embodiment. Although it is contemplated that engine 10 might be constructed having only a single cylinder and single piston, most embodiments will include a plurality of cylinders and pistons, typically at least eight, and embodiments are contemplated wherein engine 10 includes 12 cylinders, or even up to 16 or more cylinders depending upon the application. The arrangement of cylinders in engine 10 may comprise any known configuration, such as a V-pattern, in-line, radial, opposed, etc. In many embodiments, size and space will be at a premium and thus a V-pattern engine, for example, may be a practical design.

Engine 10 may be either of a two-stroke or four-stroke engine, although it is contemplated that a four-stroke cycle will be a practical implementation strategy. To this end, fuel will be injected via fuel injectors 16 at least about once every fourth piston stroke. Each piston 21 will typically have a stroke distance "L" that is between about 2 inches and about 3 inches, and embodiments are contemplated wherein the stroke distance of each piston 21 will be about 2.5 inches. Given the typical stroke distance of each piston 21, the total displacement of each cylinder 14 of engine 10 will typically be less than about 25 cubic inches and may be between about 6 cubic inches and about 25 cubic inches. Embodiments are contemplated wherein the total displacement of each cylinder 14 will be between about 7 cubic inches and about 25 cubic inches, and may be about 14 cubic inches, for example.

At least a portion of outlet orifices 22 of each fuel injector 16 will be between about 50 microns and about 110 microns in diameter, $D_2$ in FIG. 2. References herein to microns should be understood as corresponding to metric units, thus 50 microns equals 0.05 millimeters, 60 microns equals 0.06 millimeters, 85 microns equals 0.085 millimeters, 90 microns equals 0.09 millimeters and 110 microns equals 0.11 millimeters. In certain embodiments, some or all of orifices 22 will be between about 0.06 millimeters and about 0.09 millimeters, and some or all may be about 0.085 millimeters. Orifices 22 may be formed by laser drilling holes in injector tip 20 connecting an exterior of injector tip 20 with a nozzle chamber 24 of each fuel injector 16. One suitable laser drilling process is taught in commonly owned U. S. Pat. No. 6,070,813 to Durheim. Although it is contemplated that laser drilling of orifices 22 will be a workable strategy, other methods of forming ultra small injector orifices may be used. For instance, orifices 22 may be formed via known methods of coating or plating larger holes down to the desired diameter, or casting ceramic injector nozzles with small wires therein, and burning the wires away during curing of the nozzles, or any other currently known or to be discovered injector orifice making technique.

The number of orifices 22 may vary, in most embodiments the ultra-small orifices of orifices 22 will number greater than about 8 and typically between about 10 and about 30. Flow area will vary with the square of a scale factor in orifice diameter. Thus, designing an engine having fuel injector orifices with approximately one half the diameter of conventional, 160 micron orifices for example, will yield a flow area per each 80 micron orifice that is ¼ that of a 160 micron orifice. Thus, in this example, at least 4 smaller holes are necessary to equal the flow area capability of one larger orifice.

Depth of penetration of the fuel spray will be generally linearly related with orifice size. The likelihood and degree of wall wetting and spraying of the injected fuel onto a piston face in a given cylinder will typically be related to depth of penetration of the fuel spray. Accordingly, because smaller cylinder bores tend to experience wall wetting more easily than larger bores, it may be generally desirable to utilize relatively smaller orifices with relatively smaller cylinder bore sizes. For example, in an embodiment wherein $D_1$ is relatively closer to 2 inches, orifices having a diameter $D_2$, relatively closer to 0.05 millimeters may be appropriate. The converse may be applicable to larger size cylinders, e.g. closer to 3 inches and having fuel injector orifices closer to 0.11 millimeters.

In one specific example, it is contemplated that engine 10 will utilize a fuel system capable of delivering a fuel injection pressure of at least about 150 MPa, and in some instances at least about 240 MPa. Increased fuel injection pressures have been found to enhance mixing of the fuel and air without substantially affecting the depth of penetration of atomized fuel into the cylinder. Fuel flow rate scales with the square root of the scale factor, thus doubling injection pressure will yield an increase in flow rate for a given orifice size that is about $\sqrt{2}$ times the original flow rate.

The present disclosure further provides a method of operating an internal combustion engine. The method may include the step of rotating crankshaft 20 of engine 10 at greater than about 5000 RPM, and in certain embodiments or under certain operating conditions at greater than about 6000 RPM, or even greater than about 6500 RPM. The method may further include burning a sufficient quantity of injected fuel in each of cylinders 14 to yield a brake mean effective pressure (BMEP) of at least about 200 pounds per square inch (PSI), and in certain embodiments or under certain operating conditions burning sufficient fuel to yield a BMEP of at least about 250 PSI, or even at least about 350 PSI.

Figure 3:
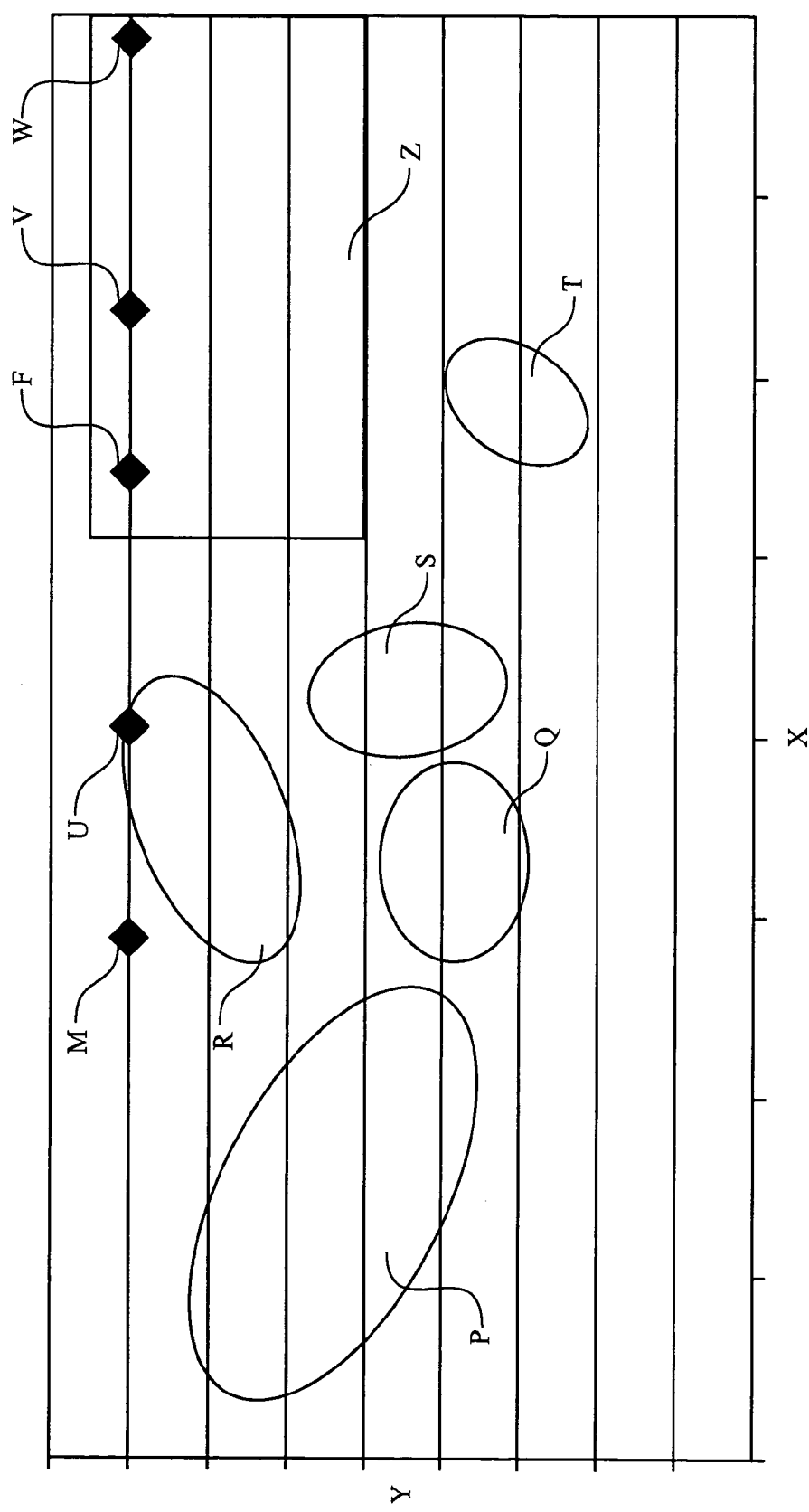
FIG. 3 is a graph illustrating plots of various compression ignition engine types relating BMEP and RPM.

Referring also to FIG. 3, three specific embodiments of engines according to the present disclosure W, V and F are represented therein, all located within an operating zone Z of engines according to the present disclosure, described hereinbelow. Certain specifications of engines W, V and F are set forth in the following table, in comparison to conventional engines M and U. All of engines W, V and F will include a plurality of injector orifices 22 having a diameter $D_2$ within the described predetermined ranges of about 50 microns to about 110 microns. As described herein, power density is the ratio of power to mass/volume. Those skilled in the art will appreciate that bore size of a particular engine will be related to engine mass/volume. Thus, in general terms, the 6 inch bore of engine M is scaled by a factor of 2 with regard to the 3 inch bore of engine F. With a scale factor of 2, power of engine M will be about 4 times that of engine F per cylinder, as power varies with the square of the scale factor. Mass and volume of engine M, however, will be about 8 times the mass and volume of engine F per cylinder, as mass and volume vary with the cube of the scale factor. Engine F will thus be more power dense than engine M.

|  | M | U | W | V | F |
|---|---|---|---|---|---|
| bore size | 6 in. | 4 in. | 2 in. | 2.7 in. | 3 in. |
| stroke distance | 6 in. | 4 in. | 2 in. | 2.5 in. | 3 in. |
| cylinders | 4 | 4 | 16 | 12 | 16 |
| bmep | 400 psi | 400 psi | 400 psi | 400 psi | 400 psi |
| rpm | 2667 | 4000 | 8000 | 5926 | 5334 |
| power | 914 hp | 406 hp | 406 hp | 514 hp | 914 hp |
| displacement | 678.6 in³ | 201 in³ | 100.5 in³ | 171.8 in³ | 339.3 in³ |
| hp/in³ | 1.35 | 2.02 | 4.04 | 2.99 | 2.69 |

INDUSTRIAL APPLICABILITY

During a typical four-stroke cycle, a main fuel injection will take place when each of pistons 21 is at or close to a top dead center position, every fourth piston stroke and in a conventional manner. Additionally, smaller pilot and/or post injections may accompany each main injection. In a compression ignition version of engine 10, compressed air and the injected, atomized fuel will ignite and combust to drive each of the respective pistons 21 and rotate crankshaft 30. Spark ignited designs will typically use a spark plug in a well known fashion to effect ignition.

Directly injecting fuel into cylinder 14 via orifices 22 having the predetermined diameter ranges described herein can allow ignition and better or more efficient combustion of a greater quantity and proportion of the injected fuel than in designs utilizing conventional fuel injection orifices. Several advantages result from this ability. First, the potential BMEP is higher. Higher BMEP in each cylinder means that an overall greater average pressure can act on each piston 21, providing more force to drive each piston 21 in its respective cylinder 14 and rotate crankshaft 30. The relatively smaller size of atomized fuel droplets from orifices 22 than from conventional sized orifices is believed to enhance ignition and overall combustion as compared to the larger fuel droplets in a conventional design. The spray pattern from each injector orifice may have such a spread angle and internal fuel/air ratio that the mixing with the charge air may be much faster. Accordingly, this may allow both a greater absolute quantity of fuel to be burned, and may allow the fuel to be burned faster and more easily ignite. It may also allow a greater proportion of the fuel injected to burn than in earlier designs. The higher injection pressure expected to be used in conjunction with the smaller orifices will help compensate for the lower flow rates of the smaller orifices and also will help fuel/air mixing without substantially affecting the depth of fuel penetration. In general, the combination of smaller orifices and higher pressure can thus allow better combustion before reaching wall-wetting and its associated degradation of combustion.

Secondly, given the inherently limited time within which to burn the injected fuel, the relatively smaller fuel droplets and a lower fuel/air ratio within the fuel spray plume available in engine 10 can allow fuel ignition and combustion to take place more quickly, allowing relatively faster piston stroke speeds and correspondingly greater engine RPMs. The combination of relatively greater BMEP and higher RPM allows engine 10 to operate with a relatively higher power, and hence with a higher power density than many heretofore available small cylinder bore engine designs.

Certain earlier small cylinder bore engines were able to approach the BMEP possible in engine 10, but not without shortcomings in other operating parameters. In order to burn sufficient fuel during each power stroke to achieve higher BMEP, many earlier engines typically operated at lower RPM than engine 10. In an attempt to cram more fuel into each cylinder for every ignition stroke, and increase the BMEP, in some known operating schemes an excess of fuel is delivered to each cylinder. Where an excess of fuel is made available, however, the quantities of unburned hydrocarbons, soot and other pollutants may be so high as to make operation undesirable and inefficient in many environments. For instance, a visible "smoke signature" may be undesirable in certain military applications.

Similarly, certain earlier small bore engine designs are known that operate at an RPM approaching that of engine 10, but not without their own set of tradeoffs. In such relatively higher RPM engines, BMEP tends to be lower as smaller fuel injection quantities are injected to avoid excessive smoke and wasting of fuel. As a result, such engines may operate at relatively high RPM, but insufficient fuel can be burned during each power stroke to reach higher BMEP. In either previous design/scheme the available power of the engine is relatively lower than in similar engines of larger size, and the power density of such smaller engines tends to be lower than what it might in theory be given their relatively smaller size.

Engine horsepower is directly proportional to both RPM and BMEP, hence the capability of engine 10 to operate at both relatively high RPM and BMEP allows the total available power of engine 10 to be significantly greater than in previously known designs. Given the relatively small size of engine 10, its power density can be more commensurate with its actual size, and engine 10 can take fuller advantage of its small scale design than previous engines.

Engine 10 provides still further advantages over known designs which relate to the enhanced ease of ignition of the fuel injected through orifices 22. During cold starting conditions, many known compression ignition engines utilize external heat sources or the addition of combustible compounds such as ether to initially begin operating. In a compression ignition version of engine 10, the need for these and similar starting aids may be reduced over earlier designs or eliminated, as the smaller fuel droplets and lower fuel/air ratio in the fuel spray plume tend to make ignition occur more readily.

Further advantages of engine 10 relate to its ability to quiescently mix fuel and air in certain contemplated embodiments. This approach contrasts with most if not all earlier small cylinder bore designs wherein "swirl" mixing was necessary to mix the charge of fresh air with injected fuel. Swirl mixing requires a swirling of the charge of air delivered to the cylinder, primarily via appropriate geometry of the air intake system or turbochargers and cylinder ports. In contrast, quiescent mixing is commonly used in larger engine designs, wherein simply spraying the fuel into unswirled air will provide sufficient mixing. Quiescent mixing may have the advantage of transferring less heat from the combustion space to the cylinder walls, head and piston during combustion and, accordingly, will allow more heat energy to be converted to shaft horsepower rather than transferred to the coolant through the cylinder walls, head and piston.

Still further advantages relate to the fuel economy of engine 10, as well as its relatively lower emissions. Burning more of the injected fuel allows the relative quantity of unburned hydrocarbons emitted from engine 10 to be reduced, improving its use of the fuel made available. In some contemplated embodiments, such as in certain aircraft, weight may be at a premium. Thus, in engine 10 the mass and size of the engine itself are not only relatively smaller, but the quantity of fuel that must be carried for a given travel range is reduced. In addition, the relatively higher proportion of fuel burned can reduce the smoke emitted during operation. There has been a perception that diesel engines often emit relatively large quantities of visible smoke. Aesthetics, environmental and in some instances tactical concerns, such as in military vehicles, can make minimizing visible smoke desirable or imperative. Engine 10 will typically be capable of substantially smokeless operation, for example, having a Bosch Smoke Number of 3 or less for transient operation and 2 or less for steady state operation. One means for quantifying the smoke content of engine exhaust is an exhaust opacity "smoke meter" such as the Bosch ESA 110—Computer Controlled Smoke Meter, available from Equipment Supplies Biddulph of Biddulph, Staffs, United Kingdom and other commercial suppliers.

Turning to FIG. 3, there is shown a plot of the operating zone of several different sets of conventional diesel engines in comparison to the operating zone Z of engine 10, and approximate locations of engines M and U of the foregoing table. The Y axis represents BMEP whereas the X axis represents RPM. In FIG. 1, set P represents a group of relatively heavy duty diesel engines having a BMEP between about 250 PSI and about 325 PSI. The engines of set P may include relatively smaller diesel engines, such as small scale power generators, mid-size engines such as might be found in trucks or off-highway work machines, and large diesel marine or power generation engines. The range of RPM in engines of set P tends to be between about 1000 RPM and about 2500 RPM. Set Q includes engines such as are known from common pick-up trucks, having a relatively higher RPM but lower BMEP than those of set P. Set R includes engines such as certain military vehicles having BMEP between about 350 PSI and about 400 PSI, and RPM between about 3000 and about 4000. Set S in turn includes such engines as may be used in many European passenger cars. Set T includes engines such as certain military motorcycle engines and engines proposed for unmanned aerial vehicles, with BMEP between about 150 PSI and 175 PSI and RPM between about 5500 and about 6000. As illustrated in FIG. 3, the operating zone of engine 10 includes higher BMEP and RPM in combination than any of the other, known engine types or groups. Pushing the engine RPM limits above that of known engines, particularly diesels, and elevating the attainable BMEP as described herein can thus provide a relatively small, lightweight and powerful engine. Point V of FIG. 3 represents one possible embodiment of the present disclosure, capable of a BMEP of about 400 PSI or greater, and an RPM between about 6000 and about 6500.

The present description is for illustrative purposes only, and should not be construed to narrow the breadth of the present disclosure in any way. Thus, those skilled in the art will appreciate that various modifications might be made to the presently disclosed embodiments without departing from the intended spirit and scope of the present disclosure. For example, while many of the embodiments described herein are discussed in the context of both elevated BMEP and elevated RPM, those skilled in the art will appreciate that in certain applications it may be desirable to operate an engine with only one of RPM or BMEP significantly elevated as compared to conventional engines. It may be noted that set Z of FIG. 3 encompasses a relatively broad operating range of both BMEP and RPM. Small cylinder bore engines might be designed according to the present disclosure capable of operating at relatively high RPM of at least about 7500, but with BMEP no greater than about 200 PSI. Similarly, higher BMEP engines, but with relatively lower RPM may be desirable for other applications. The directly proportional relationship of both RPM and BMEP with power thus allows substantial flexibility in designing relatively high power density, small cylinder bore direct injected engines according to the present disclosure. Still further embodiments are contemplated wherein orifice size, shape, orientation, etc. varies, and can vary orifice to orifice on a given injector tip. This includes, for example, using a plurality of ultra-small orifices, a plurality of larger, conventional sized orifices, with individual geometric shape and orientation varying to create a simple or complex array of orifices to provide the best overall spray pattern. Thus, there need be no particular sizing or any particular number or arrangement of ultra-small hole orifices so long as a sufficient number are provided to impart the desired operating characteristics, as described herein. Other aspects, features and advantages will be apparent upon an examination of the attached drawing Figures and appended claims.

What is claimed is:

1. An internal combustion engine comprising:
   an engine housing having at least one cylinder, said cylinder having a diameter that is less than about 3 inches;
   a piston movable within said at least one cylinder and configured to compress a fuel and air mixture therein to a compression ignition state; and
   a fuel injector disposed at least partially within said at least one cylinder, said fuel injector having a plurality of outlet orifices having a diameter between about 0.05 millimeters and about 0.11 millimeters; and
   wherein a quantity of fuel is burned in each cylinder to yield a brake mean effective pressure of at least about 200 pounds per square inch.

2. The internal combustion engine of claim 1 wherein said engine housing includes a plurality of cylinders.

3. The internal combustion engine of claim 2 wherein said plurality of cylinders includes at least 8 cylinders.

4. The internal combustion engine of claim 3 comprising a plurality of pistons, each of said pistons being disposed at least partially within one of said cylinders and having a stroke distance between about 2 inches and about 3 inches.

5. The internal combustion engine of claim 4 wherein each of said cylinders has a diameter between about 2.5 inches and about 3.0 inches.

6. The internal combustion engine of claim 5 comprising a plurality of fuel injectors, each of said fuel injectors being disposed at least partially within one of said cylinders and including a plurality of outlet orifices having a diameter between about 0.06 millimeters and about 0.09 millimeters.

7. The internal combustion engine of claim 6 wherein:
   said plurality of cylinders includes 12 cylinders arranged in a V-pattern, each of said cylinders having a diameter between about 2.5 inches and about 2.8 inches;
   said plurality of pistons includes 12 pistons, each of said pistons having a stroke distance of less than about 3.0 inches; and
   said plurality of fuel injectors includes 12 fuel injectors, each of said fuel injectors having greater than about 10 outlet orifices.

8. A method of operating an internal combustion engine comprising the steps of:
   rotating an engine crankshaft at a speed greater than about 5000 revolutions per minute, the crankshaft being coupled with a plurality of pistons each reciprocable at least partially within an engine cylinder having a diameter less than about 3 inches; and
   injecting a quantity of liquid fuel into each of the cylinders at least once for every four strokes of the piston associated therewith, and the liquid fuel being injected through a plurality of injection orifices having a diameter between about 0.05 millimeters and about 0.11 millimeters; and
   burning at least every fourth piston stroke via compression ignition a quantity of liquid fuel in each cylinder to yield a brake mean effective pressure of at least about 200 pounds per square inch.

9. The method of claim 8 wherein the injecting step comprises injecting the fuel with a fuel injector having a plurality of outlet orifices, greater than about 10, each having a diameter within a predetermined range.

10. The method of claim 9 wherein the injecting step comprises injecting the fuel with a fuel injector having a plurality of outlet orifices each having a diameter that is between about 0.06 millimeters and about 0.11 millimeters.

11. The method of claim 10 wherein the injecting step comprises injecting the fuel at a pressure equal to at least about 150 MPa.

12. The method of claim 10 wherein the rotating step comprises rotating the engine crankshaft at a speed that is greater than about 6000 revolutions per minute.

13. The method of claim 12 wherein the igniting step comprises compression igniting a sufficient quantity of fuel in each respective cylinder to yield a brake mean effective pressure of at least about 300 pounds per square inch.

14. The method of claim 8 wherein the igniting step comprises igniting a sufficient proportion of the quantity of fuel injected in the injecting step to yield substantially smokeless exhaust.

15. The method of claim 14 comprising the step of quiescent mixing air with the fuel injected in the injecting step.

16. An internal combustion engine comprising:
   an engine housing having at least one cylinder disposed therein;
   at least one piston, with a diameter less than or equal to about 3 inches, disposed at least partially within said at least one cylinder and defining a displacement that is less than about 25 cubic inches, said piston being movable within said at least one cylinder and configured to compress a fuel and air mixture therein to a compression ignition state; and
   at least one fuel injector operable to inject a fuel into said at least one cylinder, and having a plurality of outlet orifices with a diameter between about 0.05 millimeters and about 0.11 millimeters wherein a quantity of fuel is burned in each cylinder to yield a brake mean effective pressure of at least 200 pounds per square inch.

17. The engine of claim 16 wherein:
   said at least one cylinder includes at least eight cylinders each defining a displacement between about 6 cubic inches and about 25 cubic inches;
   said at least one piston comprises a plurality of pistons each movable at least partially within one of said at least eight cylinders; and
   said at least one fuel injector comprises a plurality of fuel injectors each disposed at least partially within one of said at least eight cylinders.

18. The engine of claim 17 wherein:
   each of said pistons defines a displacement between about 7 cubic inches and about 25 cubic inches; and
   at least a portion of the outlet orifices of each of said fuel injectors have a diameter between about 0.06 millimeters and about 0.09 millimeters.

19. The engine of claim 18 wherein:
   each of said pistons defines a displacement equal to about 14 cubic inches; and
   at least a portion of the outlet orifices of each of said fuel injectors have a diameter equal to about 0.085 millimeters.

* * * * *